July 21, 1959     W. I. KENNEDY     2,895,196
DISPOSABLE SEPARABLE LOCK FOR SAFETY PINS
Filed Dec. 6, 1954
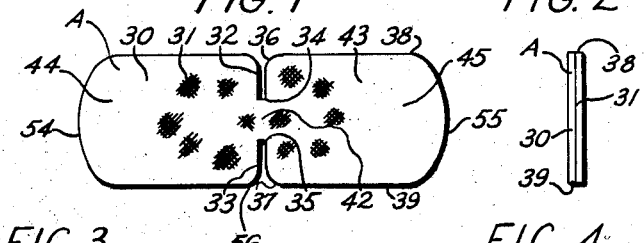
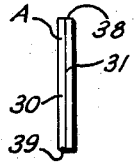
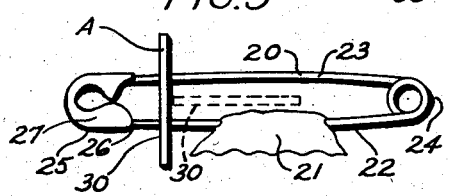
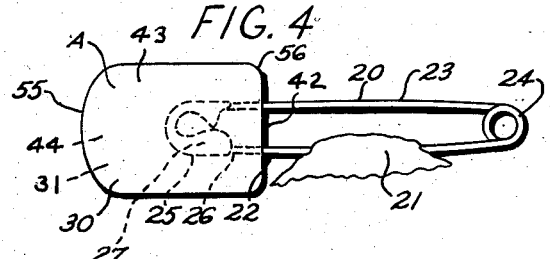
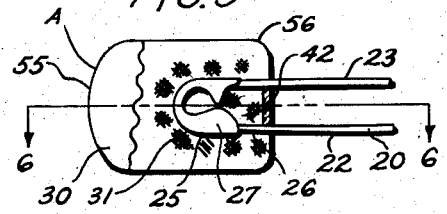
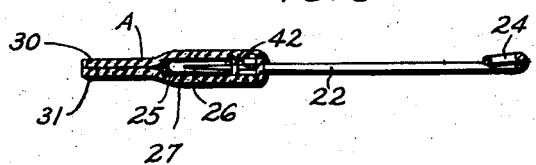
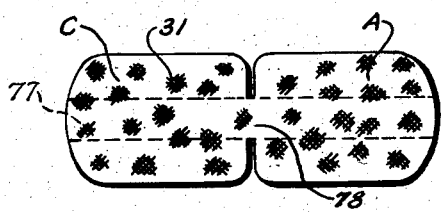
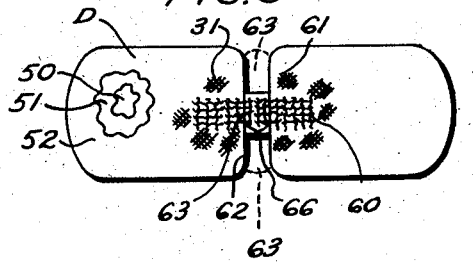
INVENTOR.
WALTER I. KENNEDY
BY
Pearson & Pearson
ATTORNEYS

United States Patent Office 2,895,196
Patented July 21, 1959

2,895,196

DISPOSABLE SEPARABLE LOCK FOR SAFETY PINS

Walter I. Kennedy, Dorchester, Mass.

Application December 6, 1954, Serial No. 473,301

2 Claims. (Cl. 24—156)

This invention relates to a locking device for safety pins or the like, to prevent a closed pin from opening inadvertently.

It is well known that a safety pin includes a pointed leg of resilient metal arranged to be held in closed position by a safety pin head or sheath. Pressure on the body of the pin may sometimes cause the head to release the point, thus creating a dangerous hazard especially when used on the garments of a baby. Many devices have been proposed for permanent attachment to a pin for preventing such inadvertent opening, such as sliding keepers, rotatable keepers and pivoted keepers. These devices add to the cost of manufacture of the pin and are usually difficult to manipulate when the pin has been passed through fabric. Furthermore, it is usually necessary to add more mechanism to lock the keeper in place, none of which is positive in view of the resilient easily deformable nature of the pin itself.

It is an object of this invention to provide a separate locking device for safety pins, which may be easily installed and removed and requires no change in the many pins now already in use.

Another object of the invention is to provide a safety pin locking device, which is separate from the pin and is made of low cost sheet material such as paper, whereby it is disposable after a single use.

A further object of the invention is to provide a safety pin locking device which may be easily formed in quantity from a web of adhesive-carrying sheet material, the web being adapted to carry an advertisement so that the articles may be disposable after use and sold at extremely low price.

Still another object of the invention is to provide a safety pin locking device made of a strip of paper or the like, the strip being adapted to hold the legs of a safety pin apart and to be firmly locked in position around the entire head of the pin.

In the drawing:

Fig. 1 is a plan view of a safety pin locking device according to the invention before installation on a safety pin.

Fig. 2 is an end view of the device shown in Fig. 1.

Fig. 3 is a side view of a closed safety pin attached to fabric with the device of this invention shown in dotted lines as it is inserted edgewise between the parallel legs of the pin and shown in full lines as it is then turned at right angles.

Fig. 4 is a view similar to Fig. 3 with the device of this invention shown folded in half around the head of the pin and the two halves adhered to each other.

Fig. 5 is a view similar to Fig. 4 with parts broken away to show the web of the device offering compression resistance to the movement of the pointed leg of the pin.

Fig. 6 is a plan view of the device shown in Figs. 3–5 in section on line 6—6 of Fig. 5.

Figs. 7 and 8 are views similar to Fig. 1 of modifications of the device.

As shown in the drawing, the device of this invention is especially useful with safety pins such as 20 of a well known type. It may also be used with any similar pin device having a movable pointed member latchable in a fixed hook member. The closed safety pin 20 is illustrated as attached in the usual way to fabric 21 and includes a moveable leg 22 parallel to a fixed leg 23. The fixed leg 23 includes a coil or loop 24 at one end, and a head or sheath 25 at the opposite end, while moveable leg 22 includes a point 26 engaged in the groove 27 of head 25.

A preferred form of the invention is shown at A in Figs. 1 to 6 wherein 30 is a flat thin sheet of flexible disposable material. Sheet, or strip, 30 is of approximately the same length as a safety pin 20, but of considerably greater width than a safety pin 20, both pin and sheet being thin in the third dimension. A layer of adhesive 31 is affixed to one face of sheet 30 and preferably covers the entire face thereof, although the area marked with cross hatching in Fig. 1 gives a minimum desired locking effect. The adhesive layer 31 may be formed of a pressure sensitive adhesive but preferably is formed of a water soluble adhesive of a well known type such as is used on gummed labels or the like.

A pair of opposite, laterally extending slots 32 and 33 are formed intermediate of the length of sheet 30, slots 32 and 33 being aligned in the same straight line. Each slot 32 or 33 extends from an inner, closed end 34 or 35 within the confines of sheet 30 to an open, outer end 36 or 37 at the adjacent longitudinal edge 38 or 39 of sheet 30. As indicated in Figs. 3, 4 and 5 slots 32 and 33 are arranged to each receive a leg such as 22 or 23 of a safety pin 20 and are about the same width as the diameter of a leg. An integral web 42 of the material of sheet 30 is provided between the closed ends 34 and 35 of slots 32 and 33. Web 42 extends laterally of the intermediate portion of sheet 30, in alignment with slots 32 and 33 and is preferably about equal in length to the length of the space between the legs 22 and 23 of a pin 20.

As shown in Fig. 3 the locking device A of the invention is installed on a safety pin such as 20 by inserting the sheet 30 edgewise half way through the space between bars 22 and 23 of a safety pin. Sheet 30 is then turned to the full line position through an angle of 90° to cause each bar 22 or 23 to enter a slot 32 or 33. The web 42 is thus positioned between the bars 22 and 23 and offers compression resistance to prevent the bar 22 from moving inwardly out of groove 27 of head 25. As shown in Fig. 4 the two portions 43 and 44 of sheet 30 formed by the dividing line of slots 32 and 33 are then folded toward each other on the web 42 as a line of folding. The layer of adhesive 31 then causes the two portions 43 and 44 to adhere to each other on three sides of the pin head 25, and in the space between the bars 22 and 23 adjacent web 42 to firmly position the folded device A.

It should be noted that if the device A did not extend both in front of and on each side of head 25 it could be easily pivoted in the plane of the pin 20 to lose its locking effect. By firmly holding the web 42 in position by material extending well to the front and well to both opposite sides of the pin head no pivoting is possible and the device A may not be moved in any direction.

It is preferred that slots 32 and 33 be angular in outline as illustrated in Fig. 1, that the longitudinal edges 38 and 39 be straight and parallel to each other and that the lateral edges 54 and 55 be curvilinear as well as the corners such as 56 at the outer ends of slots 32 and 33. The device A may thus be stamped from a narrow web of gummed paper with little loss of material and yet with rounded corners to avoid cutting the user. The corners 56 are substantially aligned with the slots 32 and 33 and with the web 42 because the slots 32 and 33 are narrow with parallel side edges and the web 42 is short. The corners 56, are in rear of the pin head, when the identical halves of the sheet 30 are adhered, and tend to resist the pivoting action mentioned above.

Although the sheet 30 is approximately the same length as a safety pin and of considerably greater width than a safety pin, as best shown in Fig. 4, each identical half of the sheet 30 is longer than it is wide to conform to the shape of the pin head 25.

Preferably the sheet 30 is of water resistant, tearable paper in order that it will resist dampness occasioned by us on babies' diapers or the like and in order that the device may be easily torn for removal. A layer of asphalt 50 applied to a sheet of paper 51, such as shown in Fig. 10, causes the device to resist water while not appreciably affecting its flexibility, or causing the adhesive 52 to lose its effect.

Preferably also the sheet 30 is not only laminated with asphalt but is provided with reinforcing fibres such as 60 extending laterally and longitudinally of the sheet to assist in providing compression resistance. As indicated in Fig. 10 such fibres may be of glass or the like and tend to add rigidity to the web 42 of a sheet such as 30.

In Fig. 7 a modification C is shown wherein a longitudinally extending reinforcing strip 77 is affixed to the underside of a device A. Strip 77 may be of any suitable material and may be in several plies or laminations whereby a central longitudinal strip of the device C, including the web at 78 is comparatively rigid while the remainder of the device is comparatively flexible. The strip 77 is affixed to the face of the device A opposite to the face carrying the layer of adhesive 31 in order not to interfere with the desired adhesion and this construction lends itself to continuous manufacture by stamping from continuous webs of material.

As shown in Fig. 8, a modification D may be formed from a sheet 51 having an asphalt layer 50, an adhesive layer 52 and laterally extending glass fibres 60 as mentioned above. Instead of removing the material cut out of the opposite slots 61 and 62 of the sheet 51, the material such as at 63 may be folded to overlie the web 66 and thereby provide three thicknesses of material at the web.

Longitudinally extending glass fibres such as 60 may also be provided to increase the strength of the sheet 51 against compression or distortion.

I claim:
1. A safety pin locking device comprising an elongated sheet of tearable, disposable paper having a layer of adhesive on one face thereof, said sheet being divided into two identical halves by a pair of opposite, narrow, slots aligned along the lateral median line of said sheet, each said half being longer than it is wide, each said narrow slot having parallel side edges extending from a closed end outwardly substantially to the adjacent longitudinal edge of said sheet and the closed ends of said slots defining a short, integral web between said halves for resisting compression of the bars of a safety pin toward each other when said halves are folded and adhered around the head of a safety pin; and at least one slot cut-out flap, folded back and adhered to said web for increasing the compression resistance thereof in a lateral direction.

2. A safety pin locking device comprising an elongated sheet of tearable, disposable paper having a layer of adhesive on one face thereof, said sheet being divided into two identical halves by a pair of opposite, narrow, slots aligned along the lateral median line of said sheet, each said half being longer than it is wide, each said narrow slot having parallel side edges extending from a closed end outwardly substantially to the adjacent longitudinal edge of said sheet and the closed ends of said slots defining a short integral web between said halves for resisting compression of the bars of a safety pin toward each other when said halves are folded and adhered around the head of a safety pin and a strip of paper, co-extensive in length with said sheet and co-extensive in lateral dimension with said web, adhered to said sheet overlying said web for increasing the compression resistance thereof in a lateral direction.

References Cited in the file of this patent
UNITED STATES PATENTS

| | | |
|---|---|---|
| 657,018 | Trenchard Jr. | Aug. 28, 1900 |
| 792,916 | Boden | June 24, 1902 |
| 1,291,382 | Bohan | Jan. 14, 1919 |
| 1,840,409 | Randall | Jan. 12, 1932 |
| 2,035,717 | Pentz | Mar. 31, 1936 |
| 2,575,257 | Boulware | Nov. 13, 1951 |
| 2,639,479 | Dahm | May 26, 1953 |
| 2,674,556 | Pahl | Apr. 6, 1954 |